(12) United States Patent
Al-Qasim et al.

(10) Patent No.: US 10,557,317 B2
(45) Date of Patent: Feb. 11, 2020

(54) SYSTEMS AND METHODS FOR PIPE CONCENTRICITY, ZONAL ISOLATION, AND STUCK PIPE PREVENTION

(71) Applicant: Saudi Arabian Oil Company, Dhahran (SA)

(72) Inventors: Abdulaziz S. Al-Qasim, Dhahran (SA); Ahmed Y. Bukhamseen, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 245 days.

(21) Appl. No.: 15/829,413

(22) Filed: Dec. 1, 2017

(65) Prior Publication Data
US 2019/0169942 A1    Jun. 6, 2019

(51) Int. Cl.
| | |
|---|---|
| *E21B 17/10* | (2006.01) |
| *E21B 23/02* | (2006.01) |
| *E21B 33/12* | (2006.01) |
| *C09K 8/504* | (2006.01) |
| *E21B 23/00* | (2006.01) |

(52) U.S. Cl.
CPC ........ *E21B 17/1078* (2013.01); *C09K 8/5045* (2013.01); *E21B 23/02* (2013.01); *E21B 33/1208* (2013.01); *C09K 2208/10* (2013.01); *E21B 2023/008* (2013.01)

(58) Field of Classification Search
CPC ............. E21B 17/1057; E21B 17/1078; E21B 2023/008; E21B 23/02; E21B 31/005; E21B 33/1208; C09K 2208/10; C09K 8/03; C09K 8/5045; C09K 8/508; C09K 8/516

See application file for complete search history.

(56) References Cited

U.S. PATENT DOCUMENTS

| | | | |
|---|---|---|---|
| 1,699,087 A | * | 1/1929 | Woodmansee ...... E21B 17/1057 166/241.3 |
| 2,696,367 A | * | 12/1954 | Robishaw ............... E21B 17/07 175/295 |
| 2,973,996 A | | 3/1961 | Self |
| 3,268,003 A | | 8/1966 | Essary |
| 3,364,464 A | | 1/1968 | Dellinger |

(Continued)

FOREIGN PATENT DOCUMENTS

CN      105134101 A    12/2015

OTHER PUBLICATIONS

The International Search Report and Written Opinion for related PCT application PCT/US2018/063303 dated Mar. 19, 2019.

*Primary Examiner* — Daniel P Stephenson
(74) *Attorney, Agent, or Firm* — Bracewell LLP; Constance G. Rhebergen; Linda L. Morgan (57) ABSTRACT

Systems and methods for moving a tubular string within a subterranean well include a structural ring sized with a ring inner diameter to circumscribe the tubular string and a ring outer diameter to fit within a bore of the subterranean well. A plurality of individual openings are spaced around an outer diameter surface of the structural ring, each individual opening associated with an inflatable member. The inflatable member is operable to vibrationally impact an internal surface of the subterranean well with repeated inflating and deflating the inflatable member. Wheels are spaced around an inner diameter surface of the structural ring.

18 Claims, 5 Drawing Sheets

(56) References Cited

U.S. PATENT DOCUMENTS

| | | | | |
|---|---|---|---|---|
| 4,163,562 | A * | 8/1979 | Sanford | F16J 15/40 277/333 |
| 4,384,625 | A | 5/1983 | Roper et al. | |
| 4,791,998 | A | 12/1988 | Hempkins et al. | |
| 5,309,405 | A | 5/1994 | Brett et al. | |
| 5,375,476 | A | 12/1994 | Gray | |
| 5,515,922 | A | 5/1996 | Ruttley | |
| 5,517,024 | A | 5/1996 | Mullins et al. | |
| 5,579,854 | A * | 12/1996 | Barry | E21B 17/105 166/241.7 |
| 5,692,563 | A | 12/1997 | Krueger et al. | |
| 5,715,898 | A | 2/1998 | Anderson | |
| 5,740,862 | A * | 4/1998 | Sable | E21B 17/1064 166/241.2 |
| 6,009,948 | A | 1/2000 | Flanders et al. | |
| 6,148,917 | A | 11/2000 | Brookey et al. | |
| 6,209,667 | B1 | 4/2001 | Murray et al. | |
| 6,250,406 | B1 * | 6/2001 | Luke | E21B 17/105 175/325.2 |
| 6,382,333 | B1 | 5/2002 | Murray | |
| 6,585,043 | B1 | 7/2003 | Murray | |
| 6,637,524 | B2 | 10/2003 | Kruspe et al. | |
| 6,942,043 | B2 | 9/2005 | Kurkoski | |
| 7,036,611 | B2 | 5/2006 | Radford et al. | |
| 7,096,961 | B2 | 8/2006 | Clark et al. | |
| 7,409,758 | B2 * | 8/2008 | Le | E21B 17/1007 29/421.1 |
| 8,167,034 | B2 * | 5/2012 | Castro | E21B 17/1078 166/241.6 |
| 8,333,254 | B2 | 12/2012 | Hall et al. | |
| 8,733,455 | B2 | 5/2014 | Shaikh et al. | |
| 9,097,820 | B2 | 8/2015 | Rasheed | |
| 9,267,331 | B2 | 2/2016 | Radford et al. | |
| 9,284,784 | B2 | 3/2016 | Zaki et al. | |
| 9,528,338 | B2 | 12/2016 | Hall | |
| 2002/0023782 | A1 * | 2/2002 | Appleton | E21B 17/046 175/325.3 |
| 2003/0159834 | A1 | 8/2003 | Kirk et al. | |
| 2004/0007355 | A1 | 1/2004 | Hern et al. | |
| 2004/0069504 | A1 * | 4/2004 | Krueger | E21B 21/00 166/387 |
| 2005/0092527 | A1 * | 5/2005 | Le | E21B 17/1007 175/325.6 |
| 2008/0210418 | A1 * | 9/2008 | Knippa | E21B 17/017 166/118 |
| 2019/0169942 | A1 * | 6/2019 | Al-Qasim | E21B 17/1078 |

* cited by examiner

SYSTEMS AND METHODS FOR PIPE CONCENTRICITY, ZONAL ISOLATION, AND STUCK PIPE PREVENTION

BACKGROUND OF THE DISCLOSURE

1. Field of the Disclosure

The disclosure relates generally to hydrocarbon development operations in a subterranean well, and more particularly to moving tubular members within a subterranean well during hydrocarbon development operations.

2. Description of the Related Art

When moving a tubular string into a subterranean well, it is important to maintain the tubular string concentrically within the bore of the subterranean well to minimize contact between the outer surface of the tubular string and the inner surface of the subterranean well. Contact between the tubular string and the inner surface of the subterranean well can cause wear and damage to the tubular string or can result in a stuck tubular string. The tubular string can be, for example, a drill string, a casing string, or another elongated member lowered into the subterranean well.

Wear and damage to the tubular string can also be caused by cutting accumulations in the subterranean well from drilling operations. Such cuttings can accumulate, in particular, at a lower side of a deviated bore. The cuttings can reduce the velocity of fluid flow in the annulus between the tubular string and the inner surface of the subterranean well. The accumulation of cuttings can also lead to the tubular string sticking and being unable to proceed further into the subterranean well.

SUMMARY OF THE DISCLOSURE

Embodiments of this disclosure include systems and methods for using a ring assembly to cause a vibrational force with an inflatable member against the inner surface of a bore of the subterranean well to direct the tubular string within the pre-drilled bore, enabling the tubular string to remain concentric with the axis of the bore to avoid the tubular string getting stuck.

The ring assembly can be attached around the tubular string at the surface and lowered into the subterranean well around the tubular string or secured to the tubular string and lowered with the tubular string into the subterranean well. The ring assembly can use a continuous inflation and deflation technique to cause a vibration force against the inner surface of a bore of the subterranean well to cause the tubular string to remain concentric with the bore's axis and to disperse accumulated cuttings. In addition, the ring assembly can be used for zonal isolation and as temporary sealing packers. Wheels can allow the ring assembly to slide along the tubular string and pass over obstructions caused by the joint connections and other obstructing members of the tubular string.

In an embodiment of this disclosure a system for moving a tubular string has a ring assembly that includes a structural ring sized with a ring inner diameter to circumscribe the tubular string and a ring outer diameter to fit within a bore of the subterranean well. A plurality of individual openings are spaced around an outer diameter surface of the structural ring, each individual opening associated with an inflatable member, the inflatable member operable to vibrationally impact an internal surface of the subterranean well with repeated inflating and deflating the inflatable member. Wheels are spaced around an inner diameter surface of the structural ring.

In alternate embodiments the structural ring can include a piezoelectric material. The ring assembly can further include a caliper sensor assembly. The ring assembly can further include a self-orientation drive operable to align the inflatable member with one of the plurality of individual openings. The ring assembly can further include a sealing packer, the sealing packer moveable to an expanded position forming a seal with an inner diameter surface of the subterranean well. The sealing packer can include the inflatable member extended through multiple of the plurality of individual openings. The structural ring can be a jointed member moveable between an open position and a closed position, where in the open position the structural ring is operable to be positioned around a joint of the tubular string. The structural ring can include a latching mechanism, the latching mechanism operable to connect ends of the jointed member. The ring assembly can further include a motor operable to move the structural ring within the subterranean well.

In an alternate embodiments of this disclosure, a method for moving a tubular string within a subterranean well includes positioning a ring assembly around the tubular string. The ring assembly includes a structural ring sized with a ring inner diameter to circumscribe the tubular string and a ring outer diameter to fit within a bore of the subterranean well. A plurality of individual openings are spaced around an outer diameter surface of the structural ring, each individual opening associated with an inflatable member. Wheels are spaced around an inner diameter surface of the structural ring. The method further includes repeatedly inflating and deflating the inflatable member to vibrationally impact an internal surface of the subterranean well with the inflatable member.

In alternate embodiments, the structural ring can include a piezoelectric material and the method can further include delivering a signal to the piezoelectric material to vibrate the structural ring. The ring assembly can further include a caliper sensor assembly and the method can further include sensing a clearance between the outer diameter surface of the structural ring and the internal surface of the subterranean well with the caliper sensor assembly. The ring assembly can further include a self-orientation drive and the method can further include aligning the inflatable member with one of the plurality of individual openings with the self-orientation drive.

In other alternate embodiments, the ring assembly can further include a sealing packer, and the method can further include moving the sealing packer to an expanded position to form a seal with an inner diameter surface of the subterranean well. The sealing packer can include the inflatable member extended through multiple of the plurality of individual openings. The structural ring can be a jointed member moveable between an open position and a closed position and the method can further include positioning the structural ring around a joint of the tubular string with the jointed member in the open position. The structural ring can include a latching mechanism and the method can further include connecting ends of the jointed member with the latching mechanism. The ring assembly can further include a motor and the method can further include moving the structural ring within the subterranean well with the motor.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
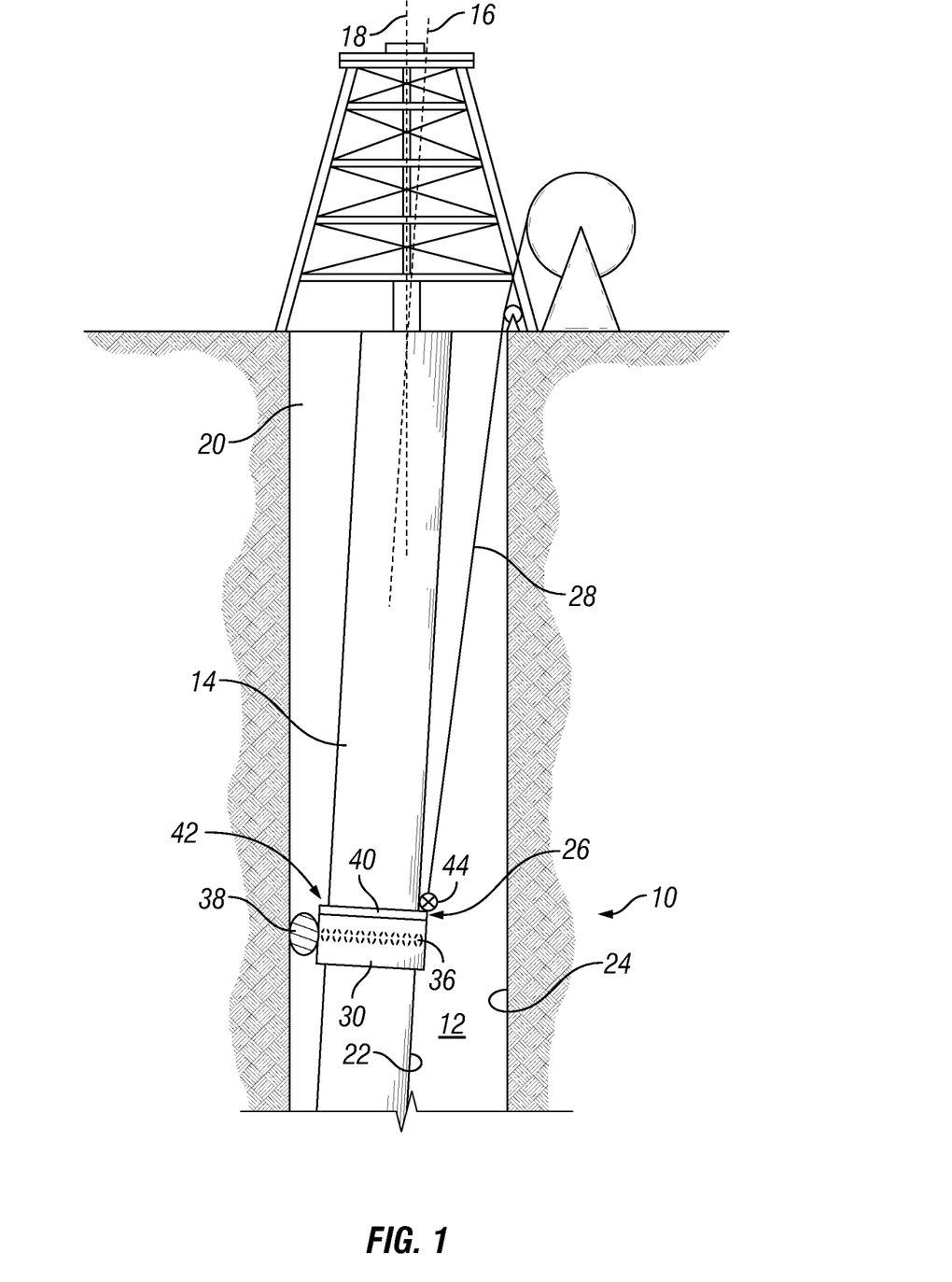
FIG. 1 is a schematic sectional representation of a subterranean well having a ring assembly, in accordance with an embodiment of this disclosure.

Looking at FIG. 1, subterranean well 10 extends downwards from a surface of the earth, which can be a ground level surface or a subsea surface. Bore 12 of subterranean well 10 can extended generally vertically relative to the surface, as shown in FIG. 1. Alternately, bore 12 can include portions that extend generally horizontally or in other directions that deviate from generally vertically from the surface. Subterranean well 10 can be a well associated with hydrocarbon development operations, such as a hydrocarbon production well, an injection well, or a water well.

Tubular string 14 extends into bore 12 of subterranean well 10. Tubular string 14 can be, for example, a drill string, a casing string, or another elongated member lowered into the subterranean well. Although bore 12 is shown as an uncased opening, in embodiments where tubular string 14 is an inner tubular member, bore 12 can be part of an outer tubular member, such as casing. As seen in FIG. 1, string axis 16 of tubular string 14 may become angled relative to bore axis 18 of bore 12. When string axis 16 is not aligned with bore axis 18, tubular string 14 is not concentric with bore 12 and the annular space 20 between the outer diameter surface 22 of tubular string 14 and inner diameter surface 24 of bore 12 will not be spaced equally around tubular string 14.

Ring assembly 26 can be used to distance tubular string 14 from inner diameter surface 24 of bore 12. In the example of FIG. 1, ring assembly 26 is lowered on control line 28, which can both support ring assembly 26 and be used for communication with ring assembly 26. Ring assembly 26 can include structural ring 30. Structural ring 30 can be sized with a ring inner diameter 32 (FIG. 6) to circumscribe tubular string 14. Ring inner diameter 32 is also sized to pass over joint connections and other obstructing members of tubular string 14. Structural ring 30 has a ring outer diameter 34 (FIG. 6) sized to fit within bore 12 of subterranean well 10. Structural ring 30 can be formed of a similar material as tubular string 1 which can be, for example, a high strength carbon steel so that structural ring 30 can withstand the temperature, pressure, corrosion, and hydrogen sulfide conditions downhole.

In certain embodiments, structural ring 30 can include piezoelectric material. The piezoelectric material can be embedded in structural ring 30. When an electric current is passed through the piezoelectric material, the piezoelectric material can vibrate, causing ring assembly 26 to vibrate. Vibrations of ring assembly 26 can prevent tubular string 14 from being stuck within bore 12 and can prevent ring assembly 26 from being stuck relative to tubular string 14.

Ring assembly 26 further includes a plurality of individual openings 36 spaced around an outer diameter surface of structural ring 30. Each individual opening 36 can be associated an inflatable member 38. Inflatable member 38 can be formed of a rubber or other elastomeric material such as acrylonitrile, nitrile, or neoprene. If ring assembly 26 is expected to be exposed to temperatures greater than 250° F., inflatable member 38 can be formed of Viton or Aflas. and can include a reinforcing material, such as metal braids, cables, or bands, for increasing the strength of the inflatable member 38. A chemical bonding material is used to secure inflatable member 38 to an outer diameter of structural ring 30. Inflatable member 38 can be bonded to structural ring 30 around each individual opening 36.

Inflatable member 38 can be inflated and deflated by methods known by a person having ordinary skill in the art of downhole packers. For example, inflatable member 38 can be expanded mechanically or can be inflated by using a spotting fluid that will trigger the inflation and deflation of inflatable member 38 when inflatable member 38 is located at a target region of bore 12 where pipe concentricity or pipe sticking is a concern. Such target region may be, for example at a bend, curve or other eccentricity of bore 12. Individual openings 36 can be located around the entire outer circumference of structural ring 30. There may be a single row of individual openings 36 around the outer circumference of structural ring 30, or more than one row of individual openings 36 around the outer circumference of structural ring 30.

Ring assembly 26 can further include sensors, such as caliper sensor assembly 40. Caliper sensor assembly 40 can include, for example, an ultrasonic sensor, a neutron-derived sensor, a density derived sensor, or a mechanical type sensor, or any combination of such sensors. Caliper sensor assembly 40 can include a sensor sub that is attached to, or made part of structural ring 30. Elements of caliper sensor assembly 40, can be located within, or can communicate through, individual openings 36. Temperature sensors, pressure sensors, or other known downhole sensors, such as those used for logging while drilling, can be located within, or can communicate through, individual openings 36.

Caliper sensor assembly 40 can measure the standoff of the ring assembly 26 from inner diameter surface 24 of bore 12. Caliper sensor assembly 40 can, for example, sense the clearance between the outer diameter surface 22 of tubular string 14 and the internal surface of subterranean well 10. When string axis 16 is not aligned with bore axis 18, caliper sensor assembly 40 can identify the minimal location 42 of the outer surface portion of ring assembly 26, where the outer surface portion of ring assembly 26 is closest to inner diameter surface 24 of bore 12. Inflatable member 38 can be inflated through at lease on of the individual openings 36 located at minimal location 42 so that inflatable member 38 pushes against inner diameter surface 24 of bore 12 at minimal location 42 to assist in to distance tubular string 14 from inner diameter surface 24 of bore 12. Inflatable member 38 can further be inflated and deflated in succession to cause a vibration through tubular string 14 so that tubular string 14 does not become stuck within bore 12 due to, for example, friction between outer diameter surface 22 of tubular string 14 and inner diameter surface 24 of bore 12 or interaction between tubular string 14 and cuttings within bore 12.

In order to orient inflatable member 38 for inflation at minimal location 42, ring assembly 26 can include communication and control assembly 44. Communication and control assembly 44 can include a self-orientation drive for aligning an inflation valve with one of the plurality of individual openings 36 at minimal location 42. Communication and control assembly 44 can also relay a command for signaling the inflation valve to inflate inflatable member 38 at the aligned individual opening 36.

Communication and control assembly 44 can also include a communication coupling that provides for two-way power and data communication between ring assembly 26 and the surface by way of control line 28. The communication coupling can be for example, an inductive type coupling or other known power and data coupling. In addition to the communication coupling, control line 28 can be mechanically secured to structural ring 30.

Figure 2:
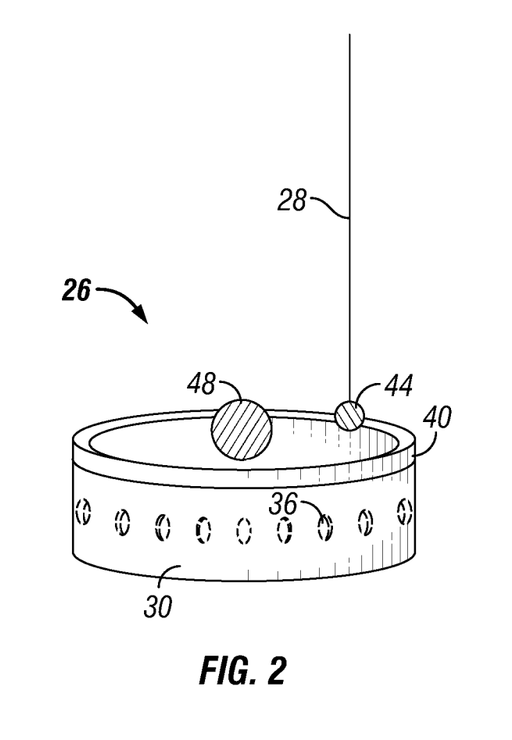
FIG. 2 is a schematic perspective view of a ring assembly supported by a control line, in accordance with an embodiment of this disclosure.

In the example of FIGS. 1-2, ring assembly 26 can be powered by control line 28. In alternate embodiments, ring assembly 26 can be powered by other known methods, such as from the mud or other flow through bore 12 or batteries, the systems of which are part of communication and control assembly 44. In embodiments where ring assembly 26 does not rely on control line 28 for power or does not have a control line, communication and control assembly 44 of ring assembly 26 can include a motor operable to move structural ring 30 within the subterranean well.

Looking at FIG. 2, ring assembly 26 can have wheels 48. Wheels 48 are spaced around an inner diameter surface of structural ring 30. Wheels 48 can rotate in various directions to allow structural ring 30 to both rotate around tubular string 14 or to move axially along tubular string 14. Wheels 48 can help to center structural ring 30 around tubular string 14 so that structural ring 30 can pass over joint connections and other obstructing members of tubular string 14. Wheels 48 can be spherical or can be traditional disk shaped wheels. Wheels 48 can be formed of a material that can withstand conditions within subterranean well 10, such as temperatures greater than 175 degrees Celsius, abrasive materials such as cuttings and other rock debris, and corrosive fluids such as hydrogen sulfide gas. As an example, wheels 48 can be formed of a plastic material such as polytetrafluoroethylene. Wheels 48 can alternately be formed of a flexible material, such as a rubber, that can be deformed as wheels 48 pass over joint connections or other obstructing members of tubular string 14. Alternately, wheels 48 can be otherwise biased radially outward and retractable to pass over joint connections or other obstructing members of tubular string 14.

Figure 3:
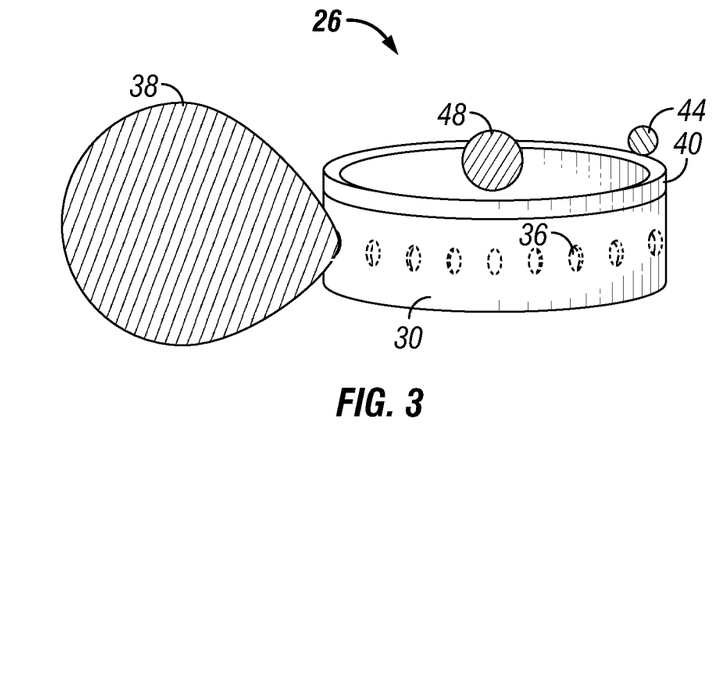
FIG. 3 is a schematic perspective view of a ring assembly with the inflatable member shown inflated in a single opening of the structural ring, in accordance with an embodiment of this disclosure.

Looking at FIG. 3, when ring assembly 26 is used to help distance tubular string 14 from inner diameter surface 24 of bore 12 or prevent tubular string 14 from being stuck within bore 12, inflatable member 38 can be inflated through a single opening 36. In the example of FIG. 3, ring assembly 26 may not include control line 28. In such an embodiment, ring assembly 26 can be moved within bore 12 by a motor of communication and control assembly 44. Alternately, ring assembly 26 can be secured to the outer diameter of tubular string 14 and carried into bore 12 with tubular string 14. In such an embodiment, ring assembly 26 can have a latching mechanism that is releasable to release ring assembly 26 from tubular string 14. This may be particularly useful, for example in deviated wells.

Figure 4:
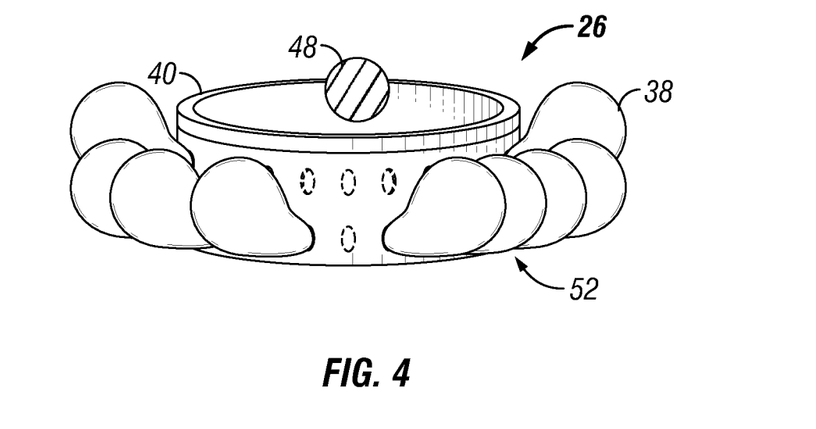
FIG. 4 is a schematic perspective view of a ring assembly with the inflatable member shown inflated in multiple openings of the structural ring, in accordance with an embodiment of this disclosure.
Figure 5:
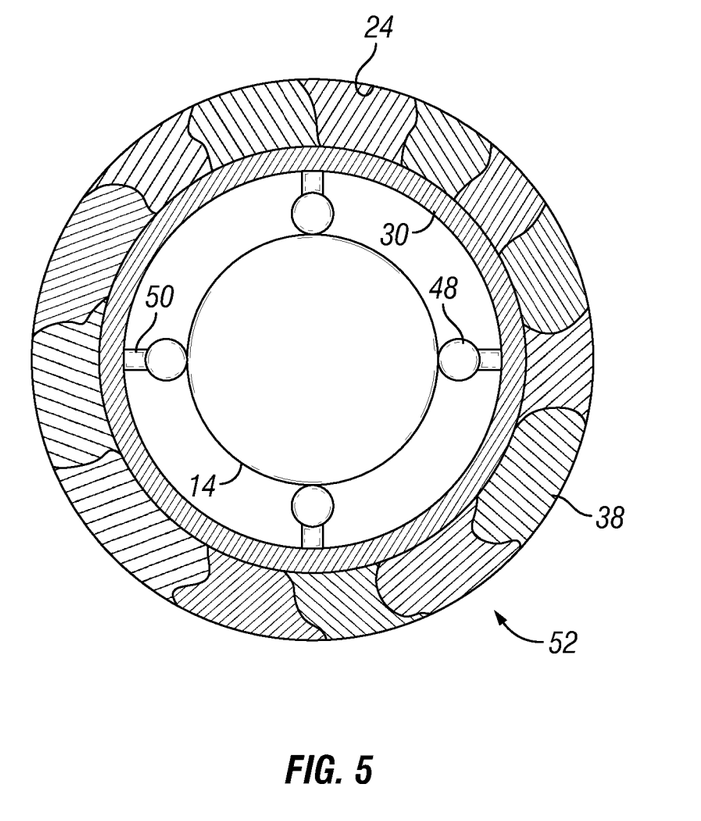
FIG. 5 is a schematic plan view of a ring assembly with the inflatable member shown inflated in multiple openings of the structural ring, in accordance with an embodiment of this disclosure.

Looking at FIGS. 4-5, ring assembly 26 can also be used for zonal isolation by forming a temporary sealing packer 52. Sealing packer 52 is moveable to an expanded position forming a seal with an inner diameter surface of subterranean well 10. Sealing packer 52 is formed by inflatable member 38 extending through multiple of the plurality of individual openings 36. When inflatable member 38 forms a seal around the entire circumference of tubular string 14 and the inner diameter surface of subterranean well 10, ring assembly 26 can act as a temporary sealing packer. As an example, during drilling operations, ring assembly 26 can provide zonal isolation. In currently available systems, a costly intervention would be required for providing zonal isolation. Systems and methods of the current application can instead provide ring assembly 26 that can be lowered from the surface at any time around tubular string 14, as needed, for providing zonal isolation.

Figure 6:
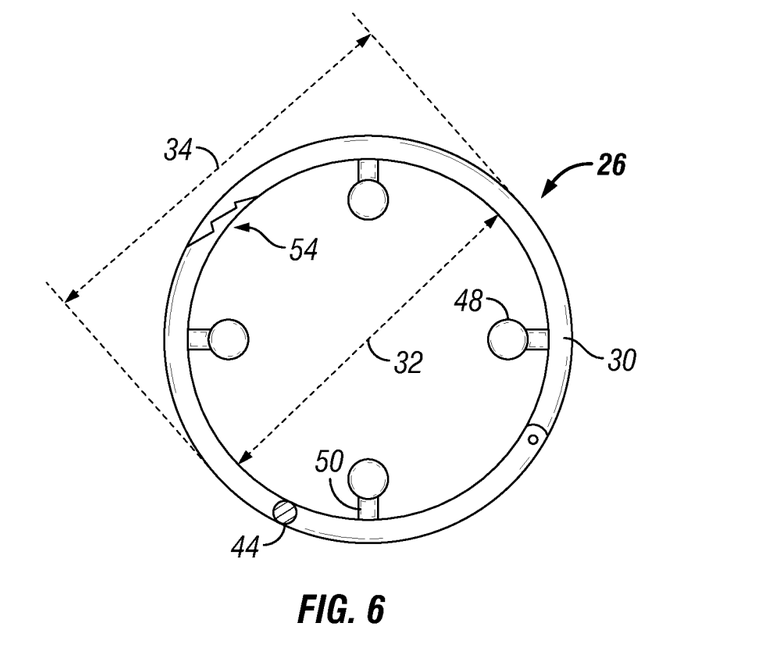
FIG. 6 is schematic plan view of a ring assembly, in accordance with an embodiment of this disclosure.

Looking at FIG. 6, in order to be secured around tubular string 14 at the surface, without having to drop ring assembly 26 over a top end of tubular string 14, structural ring 30 can be a jointed member with latching mechanism 54. Latching mechanism 54 can connect ends of the jointed member. Latching mechanism 54 can be, for example, a ratchet type connection, a pinned connection, a male and female type connection, or other suitable type connection that can connect the ends of the jointed member. The jointed structural ring 30 is moveable between an open position and a closed position. In the open position structural ring 30 is operable to be positioned around a joint of the tubular string 14 across tubular string 14 from the side of tubular string 14.

Figure 7:
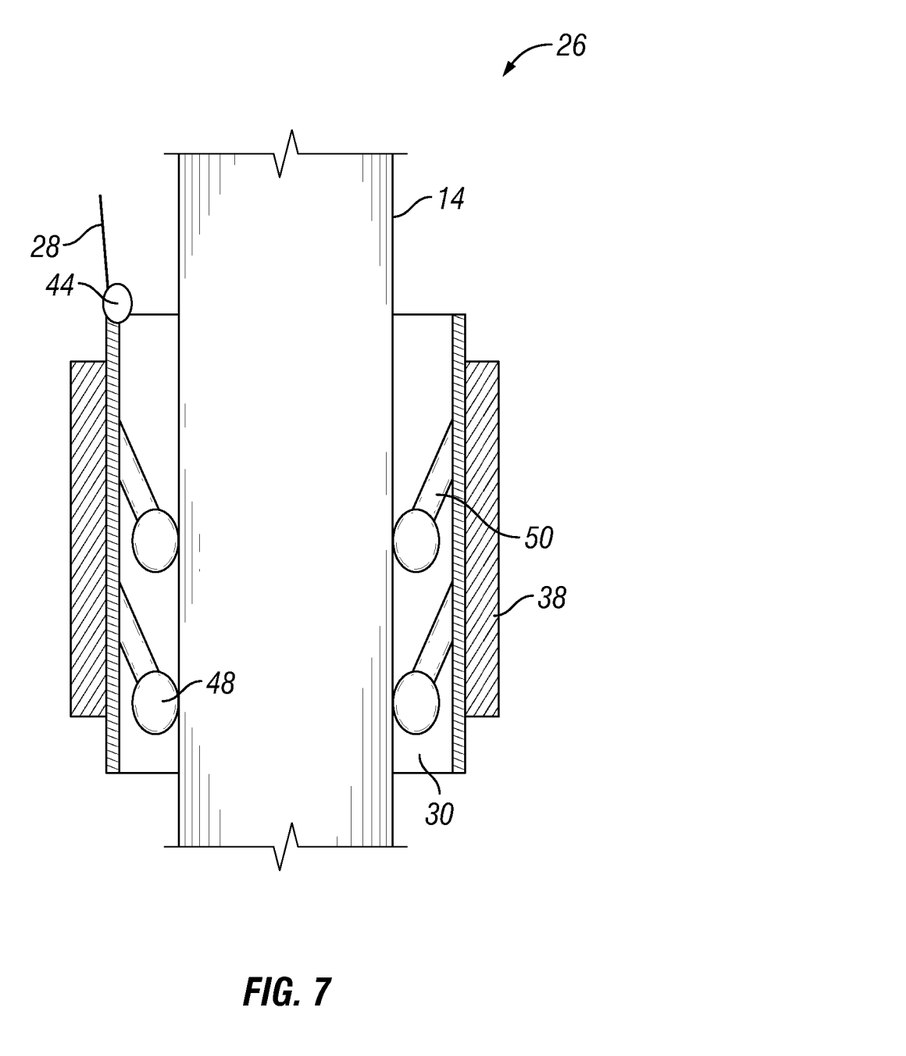
FIG. 7 is a schematic section view of a ring assembly surrounding a tubular string, in accordance with an embodiment of this disclosure.

Looking at FIGS. 6-7, in an example embodiment wheels 48 are biased radially outward by arms 50. Arm 50 is secured at a first end to an inner diameter of structural ring 30 in a manner that allows arm 50 to rotate relative to structural ring 30. Arm 50 is secured at a second end to a wheel 48.

In an example of operation, looking at FIG. 1, in order to direct tubular string 14 towards the center of bore 12 for reducing damage to tubular string 14 and avoiding sticking of tubular string 14, ring assembly 26 can be positioned around tubular string 14. When ring assembly 26 includes a jointed structural ring 30, such as shown in FIG. 6, ring assembly 26 can be positioned around tubular string 14 at the surface at any time. Ring assembly 26 can have sufficient weight so that gravity can pull ring assembly 26 into bore 12. Control line 28 can manage the descent of ring assembly 26 into bore 12 and maintain the position of ring assembly 26 at the target region of bore 12.

In alternate embodiments, ring assembly 26 can be secured to tubular string 14 and lowered with tubular string 14 into bore 12. Ring assembly 26 can then be detached from tubular string at a desired location within bore 12. In yet another alternate embodiments, ring assembly 26 can be moved within bore 12 by a motor of communication and control assembly 44.

Wheels 48 of ring assembly 26 can allow structural ring 30 to both rotate around tubular string 14 or to move axially along tubular string 14 and can permit structural ring 30 to pass over joint connections and other obstructing members of tubular string 14. Ring assembly 26 can be retrieved by control line 28, a slim wire, or a motor of communication and control assembly 44.

Caliper sensor assembly 40 can measure the standoff of the ring assembly 26 from inner diameter surface 24 of bore 12 and can identify the minimal location 42 of the outer surface portion of ring assembly 26, where the outer surface portion of ring assembly 26 is closest to inner diameter surface 24 of bore 12. Inflatable member 38 can be inflated at minimal location 42 so that inflatable member 38 pushes against inner diameter surface 24 of bore 12 at minimal location 42 to assist in to distancing tubular string 14 from inner diameter surface 24 of bore 12 to cause tubular string 14 to remain concentric within bore 12, which can reduce wear and an also result, for example in an effective and uniform primary cement bond on casing.

Inflatable member 38 can further be repeatedly inflated and deflated to vibrationally impact an internal surface of subterranean well 10 with inflatable member 38 so that tubular string 14 does not become stuck within bore 12 due to, for example, friction between outer diameter surface 22 of tubular string 14 and inner diameter surface 24 of bore 12 or interaction between tubular string 14 and cuttings within bore 12. Vibrations caused by the inflation and deflation of inflatable member 38 can also clear obstructions within bore 12, such as cutting accumulation, before such obstructions become severe. Removing such obstructions can clear the annular space 20 between the outer diameter surface 22 of tubular string 14 and inner diameter surface 24 of bore 12 to allow for continuous circulation of drilling or other annular fluids.

Caliper sensor assembly 40 of ring assembly 26 can further detect characteristics of subterranean well 10, such as temperature, pressure, bulk density of surrounding material, and other logging while drilling data. The characteristics detected by ring assembly 26 can be used to determine when inflation and deflation of inflatable member 38 is desired. As an example, the characteristics detected by ring assembly 26 can be used to predict a potential stuck pipe situation and provide a warning of such potential risk before tubular string 14 becomes stuck, or can identify an increasing accumulation of cuttings.

Structural ring 30 of ring assembly 26 can include a piezoelectric material. In order to prevent relative sticking between ring assembly 26 and tubular string 14, or between tubular string 14 and bore 12, a signal can be delivered to the piezoelectric material to vibrate structural ring 30.

There may be time when zonal isolation within bore 12 is desired. In embodiments of this disclosure, ring assembly 26 can move sealing packer 52 to an expanded position to form a seal with an inner diameter surface of subterranean well 10.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for moving a tubular string within a subterranean well, the system having:
   a ring assembly including:
      a structural ring sized with a ring inner diameter to circumscribe the tubular string and a ring outer diameter to fit within a bore of the subterranean well;
      a plurality of individual openings spaced around an outer diameter surface of the structural ring, each individual opening associated with an inflatable member, the inflatable member operable to vibrationally impact an internal surface of the subterranean well with repeated inflating and deflating the inflatable member; and
      wheels spaced around an inner diameter surface of the structural ring.

2. The system of claim 1, where the structural ring includes a piezoelectric material.

3. The system of claim 1, where the ring assembly further includes a caliper sensor assembly.

4. The system of claim 1, where the ring assembly further includes a self-orientation drive operable to align the inflatable member with one of the plurality of individual openings.

5. The system of claim 1, where the ring assembly further includes a sealing packer, the sealing packer moveable to an expanded position forming a seal with an inner diameter surface of the subterranean well.

6. The system of claim 5, where the sealing packer includes the inflatable member extended through multiple of the plurality of individual openings.

7. The system of claim 1, where the structural ring is a jointed member moveable between an open position and a closed position, where in the open position the structural ring is operable to be positioned around a joint of the tubular string.

8. The system of claim 7, where the structural ring includes a latching mechanism, the latching mechanism operable to connect ends of the jointed member.

9. The system of claim 1, where the ring assembly further includes a motor operable to move the structural ring within the subterranean well.

10. A method for moving a tubular string within a subterranean well, the method including:
- positioning a ring assembly around the tubular string, the ring assembly including:
  - a structural ring sized with a ring inner diameter to circumscribe the tubular string and a ring outer diameter to fit within a bore of the subterranean well;
  - a plurality of individual openings spaced around an outer diameter surface of the structural ring, each individual opening associated with an inflatable member; and
  - wheels spaced around an inner diameter surface of the structural ring;
- repeatedly inflating and deflating the inflatable member to vibrationally impact an internal surface of the subterranean well with the inflatable member.

11. The method of claim 10, where the structural ring includes a piezoelectric material and the method further includes delivering a signal to the piezoelectric material to vibrate the structural ring.

12. The method of claim 10, where the ring assembly further includes a caliper sensor assembly and the method further includes sensing a clearance between the outer diameter surface of the structural ring and the internal surface of the subterranean well with the caliper sensor assembly.

13. The method of claim 10, where the ring assembly further includes a self-orientation drive and the method further includes aligning the inflatable member with one of the plurality of individual openings with the self-orientation drive.

14. The method of claim 10, where the ring assembly further includes a sealing packer, and the method further includes moving the sealing packer to an expanded position to form a seal with an inner diameter surface of the subterranean well.

15. The method of claim 14, where the sealing packer includes the inflatable member extended through multiple of the plurality of individual openings.

16. The method of claim 10, where the structural ring is a jointed member moveable between an open position and a closed position and the method further includes positioning the structural ring around a joint of the tubular string with the jointed member in the open position.

17. The method of claim 16, where the structural ring includes a latching mechanism and the method further includes connecting ends of the jointed member with the latching mechanism.

18. The method of claim 10, where the ring assembly further includes a motor and the method further includes moving the structural ring within the subterranean well with the motor.

* * * * *